(12) United States Patent
Kang et al.

(10) Patent No.: US 11,877,166 B2
(45) Date of Patent: *Jan. 16, 2024

(54) METHOD AND DEVICE FOR RECOVERING BEAM FAILURE IN WIRELESS COMMUNICATION SYSTEM

(71) Applicant: LG Electronics Inc., Seoul (KR)

(72) Inventors: Jiwon Kang, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,205

(22) Filed: Jan. 23, 2023

(65) Prior Publication Data

US 2023/0224732 A1  Jul. 13, 2023

Related U.S. Application Data

(63) Continuation of application No. 17/925,770, filed as application No. PCT/KR2021/012077 on Sep. 7, 2021.

(30) Foreign Application Priority Data

Sep. 29, 2020  (KR) .......................... 10-2020-0127422

(51) Int. Cl.
*H04W 24/04*  (2009.01)
*H04W 72/044*  (2023.01)

(52) U.S. Cl.
CPC ......... *H04W 24/04* (2013.01); *H04W 72/046* (2013.01)

(58) Field of Classification Search
CPC ........................... H04W 24/04; H04W 72/046
See application file for complete search history.

(56) References Cited

U.S. PATENT DOCUMENTS

| 10,542,545 | B2 | 1/2020 | Yu et al. | |
| 2020/0052943 | A1* | 2/2020 | Jassal | H04L 5/0012 |
| 2021/0242922 | A1* | 8/2021 | Koskela | H04W 72/53 |
| 2021/0376909 | A1* | 12/2021 | Khoshnevisan | H04W 76/19 |
| 2022/0046740 | A1* | 2/2022 | Lo | H04W 76/19 |
| 2022/0103419 | A1* | 3/2022 | Zhou | H04W 72/21 |

(Continued)

FOREIGN PATENT DOCUMENTS

| KR | 20190130174 | 11/2019 |
| KR | 20200008666 | 1/2020 |

(Continued)

*Primary Examiner* — Jasper Kwoh
(74) *Attorney, Agent, or Firm* — Fish & Richardson P.C.

(57) ABSTRACT

A method and device for performing beam failure recovery in a wireless communication system. A method for a user equipment (UE) to perform beam failure recovery (BFR) in a wireless communication system may include: receiving, from a base station, a radio resource control (RRC) signaling for configuring at least one parameter related to a BFR procedure for each of a plurality of serving cells configured with two beam failure detection (BFD)-reference signal (RS) sets; based on a beam failure being detected for at least one of the two BFD-RS sets configured for at least one serving cell among the plurality of serving cells, triggering the BFR procedure for the at least one of the two BFD-RS sets based on the RRC signaling; and transmitting, to the base station, an enhanced BFR media access control (MAC)-control element (CE).

10 Claims, 11 Drawing Sheets

(56) References Cited

U.S. PATENT DOCUMENTS

2023/0006727 A1* 1/2023 Jang .................. H04L 5/0051
2023/0144010 A1* 5/2023 Kwak ................. H04B 7/024
370/329

FOREIGN PATENT DOCUMENTS

KR      20200015546     2/2020
KR      20200031142     3/2020

* cited by examiner

METHOD AND DEVICE FOR RECOVERING BEAM FAILURE IN WIRELESS COMMUNICATION SYSTEM

CROSS-REFERENCE TO RELATED APPLICATIONS

This application is a continuation of U.S. application Ser. No. 17/925,770, filed on Nov. 16, 2022, which is a National Stage application under 35 U.S.C. § 371 of International Application No. PCT/KR2021/012077, filed on Sep. 7, 2021, which claims the benefit of Korean Application No. 10-2020-0127422, filed on Sep. 29, 2020. The disclosures of the prior applications are incorporated by reference in their entirety.

TECHNICAL FIELD

The present disclosure relates to a wireless communication system, and more particularly, to a beam failure recovery method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for performing beam failure recovery in a wireless communication system.

In addition, an additional technical object of the present disclosure is to provide a method and apparatus for performing beam failure recovery when a beam failure occurs in a specific resource group or a plurality of resource groups.

The technical objects to be achieved by the present disclosure are not limited to the above-described technical objects, and other technical objects which are not described herein will be clearly understood by those skilled in the pertinent art from the following description.

In an embodiment of the present disclosure, a method for a UE to perform beam failure recovery (BFR) in a wireless communication system may include: transmitting, to a base station, a beam failure recovery request (BFRQ), based on a beam failure being detected in at least one resource group among a plurality of resource groups; receiving, from the base station, a response to the BFRQ; and transmitting, to the base station, information related to the beam failure, and the information related to the beam failure may indicate a specific resource group in which the beam failure is detected or the plurality of resource groups in which the beam failure is detected.

As another embodiment of the present disclosure, a method for a base station to perform beam failure recovery (BFR) in a wireless communication system may include: receiving, from a user equipment (UE), a beam failure recovery request (BFRQ), based on a beam failure being detected in at least one resource group among a plurality of resource groups; transmitting, to the UE, a response to the BFRQ; and receiving, from the UE, information related to the beam failure, and the information related to the beam failure may indicate a specific resource group in which the beam failure is detected or the plurality of resource groups in which the beam failure is detected.

According to an embodiment of the present disclosure, a method and an apparatus for performing beam failure recovery may be provided in a wireless communication system.

According to an embodiment of the present disclosure, when a beam failure occurs in a specific resource group or a plurality of resource groups, a method and apparatus for performing a beam failure recovery operation may be provided.

Effects achievable by the present disclosure are not limited to the above-described effects, and other effects which are not described herein may be clearly understood by those skilled in the pertinent art from the following description.

BRIEF DESCRIPTION OF DRAWINGS

Accompanying drawings included as part of detailed description for understanding the present disclosure provide embodiments of the present disclosure and describe technical features of the present disclosure with detailed description.

DETAILED DESCRIPTION

Figure 1:
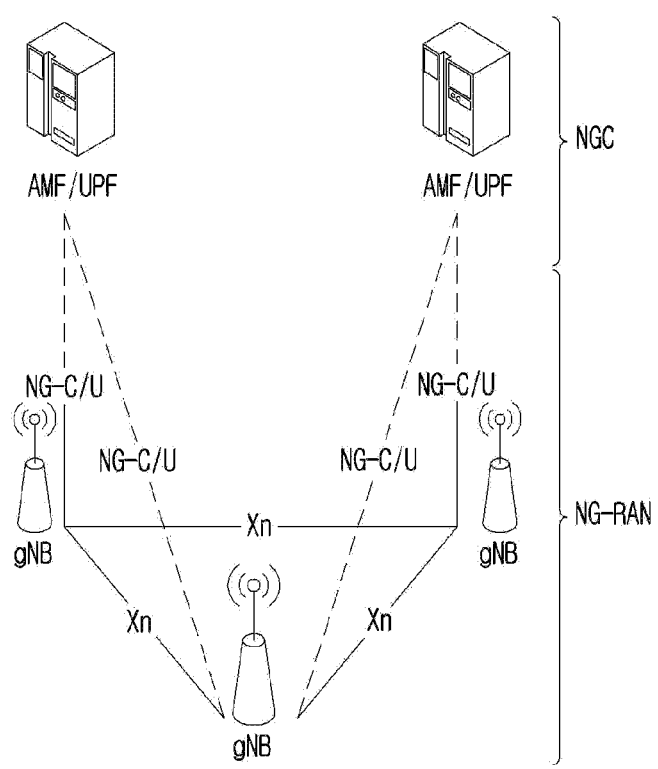
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), a SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.
- BM: beam management
- CQI: Channel Quality Indicator
- CRI: channel state information-reference signal resource indicator
- CSI: channel state information
- CSI-IM: channel state information-interference measurement
- CSI-RS: channel state information-reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
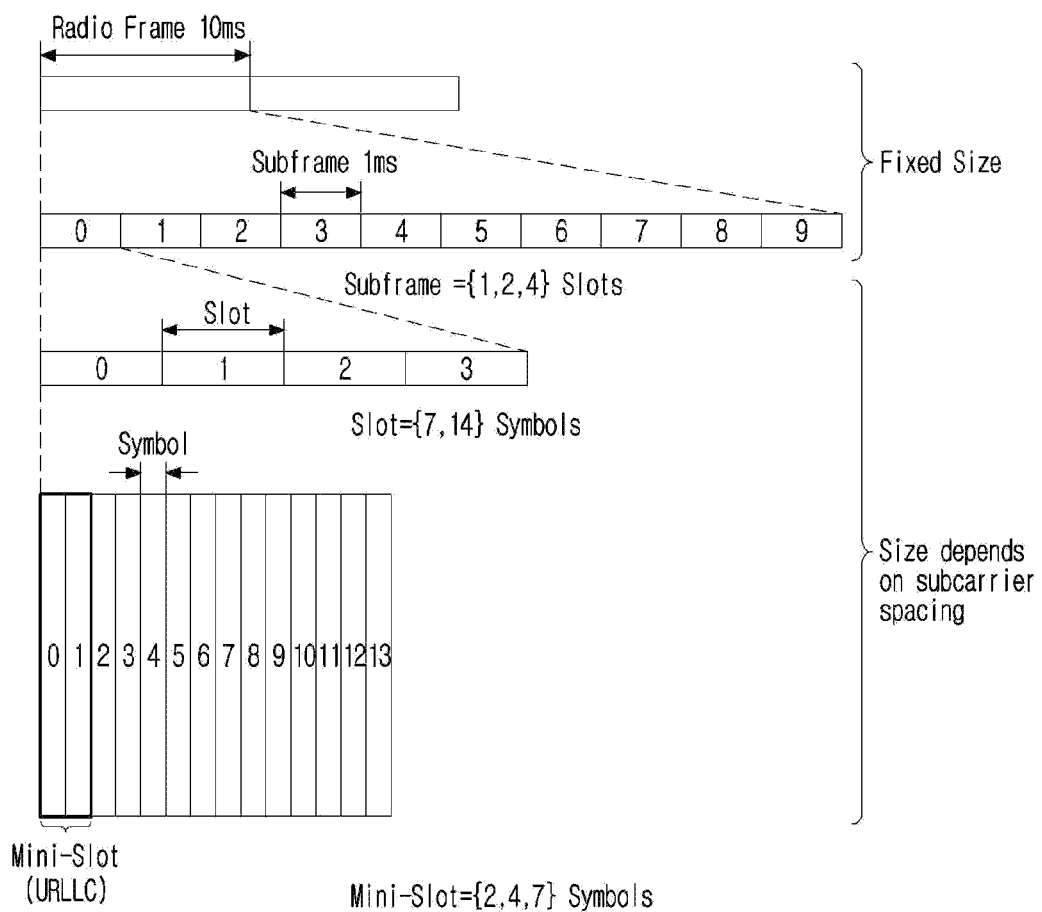
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of Tc=1/(Δf max·Nf). Here, Δf max is 480·103 Hz and Nf is 4096. Downlink and uplink transmission is configured (organized) with a radio frame having a duration of Tf=1/(Δf max Nf/100)·Tc=10 ms. Here, a radio frame is configured with 10 subframes having a duration of Tsf=(Δf max Nf/1000)·Tc=1 ms, respectively. In this case, there may be one set of frames for an uplink and one set of frames for a downlink. In addition, transmission in an uplink frame No. i from a terminal should start earlier by TTA=(NTA+NTA, offset)Tc than a corresponding downlink frame in a corresponding terminal starts. For a subcarrier spacing configuration μ, slots are numbered in an increasing order of nsμ□{0, . . . , Nslotsubframe,μ-1} in a subframe and are numbered in an increasing order of ns,fμ□{0, . . . , Nslotframe,μ-1} in a radio frame. One slot is configured with Nsymbslot consecutive OFDM symbols and Nsymbslot is determined according to CP. A start of a slot nsμ in a subframe is temporally arranged with a start of an OFDM symbol nsμNsymbslot in the same subframe. All terminals may not perform transmission and reception at the same time, which means that all OFDM symbols of a downlink slot or an uplink slot may not be used. Table 3 represents the number of OFDM symbols per slot (Nsymbslot), the number of slots per radio frame (Nslotframe,μ) and the number of slots per subframe (Nslotsubframe,μ) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
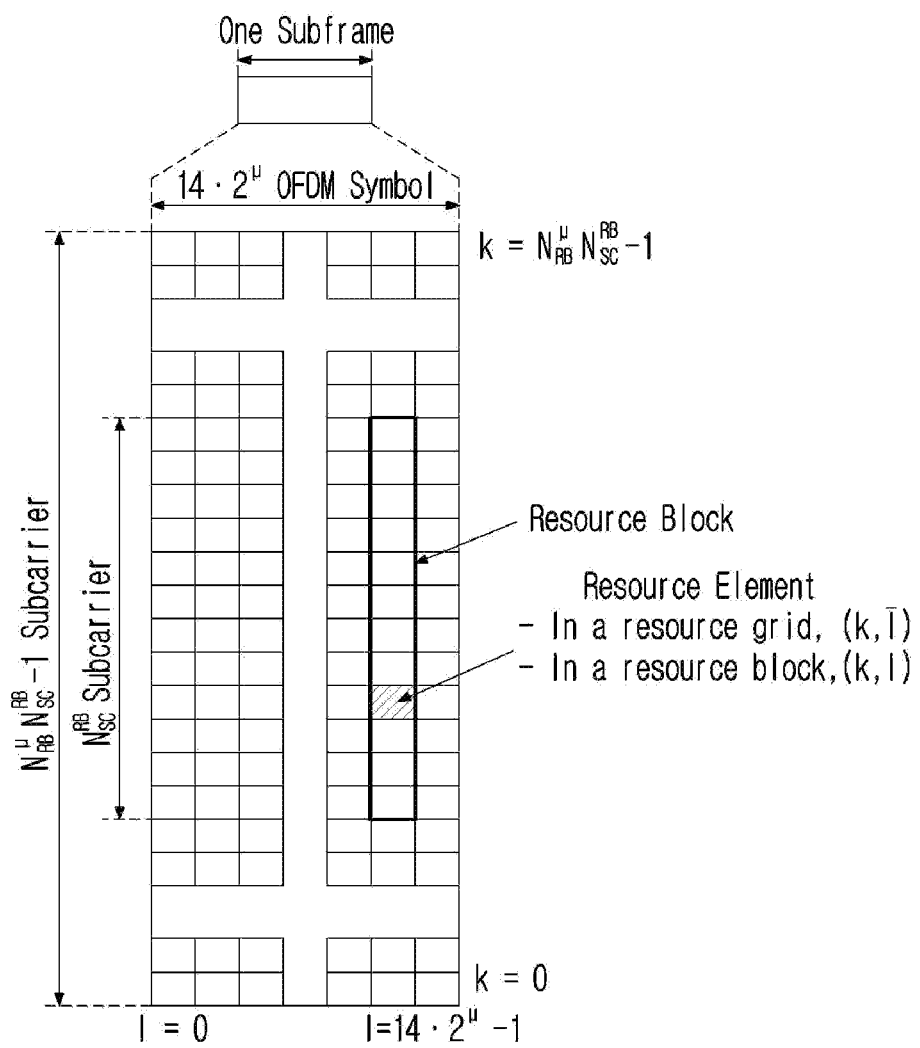
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with NRBμNscRB subcarriers in a frequency domain and one subframe is configured with 14·2μ OFDM symbols, but it is not limited thereto. In an NR system, a transmitted signal is described by OFDM symbols of 2μ,Nsymb(μ) and one or more resource grids configured with NRBμNscRB subcarriers. Here, NRBμ≤NRB max,μ. The NRB max,μ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , NRBμNscRB-1 is an index in a frequency domain and l'=0, . . . , 2μNsymb(μ)-1 refers to a position of a symbol in a subframe. When referring to a resource element in a slot, an index pair (k,l) is used. Here, l=0, . . . , Nsymbμ-1. A resource element (k,l') for μ and an antenna port p corresponds to a complex value, ak,l'(p,μ). When there is no risk of confusion or when a specific antenna port or numerology is not specified, indexes p and μ may be dropped, whereupon a complex value may be ak,l'(p) or ak,l'. In addition, a resource block (RB) is defined as NscRB=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number nCRBμ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to NBWP,isize,μ-1 in a bandwidth part (BWP) and i is a number of a BWP. A relationship between a physical resource block nPRB and a common resource block nCRB in BWP i is given by the following Equation 2.

$$n_{CRB}^{\mu}=n_{PRB}^{\mu}+N_{BWP,i}^{start,\mu}$$

[ Equation 2 ]

NBWP,istart,μ is a common resource block that a BWP starts relatively to common resource block 0.

Figure 4:
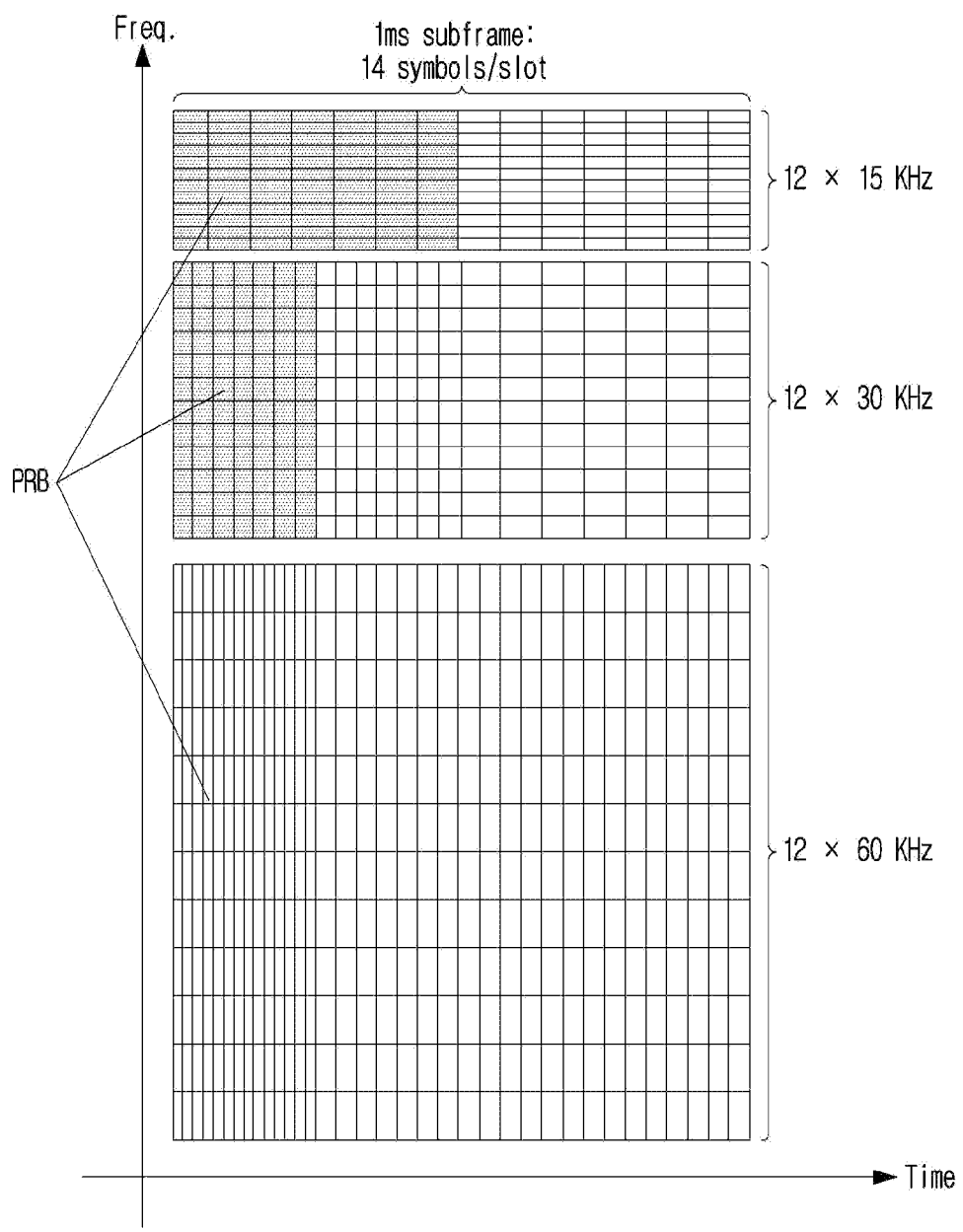
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
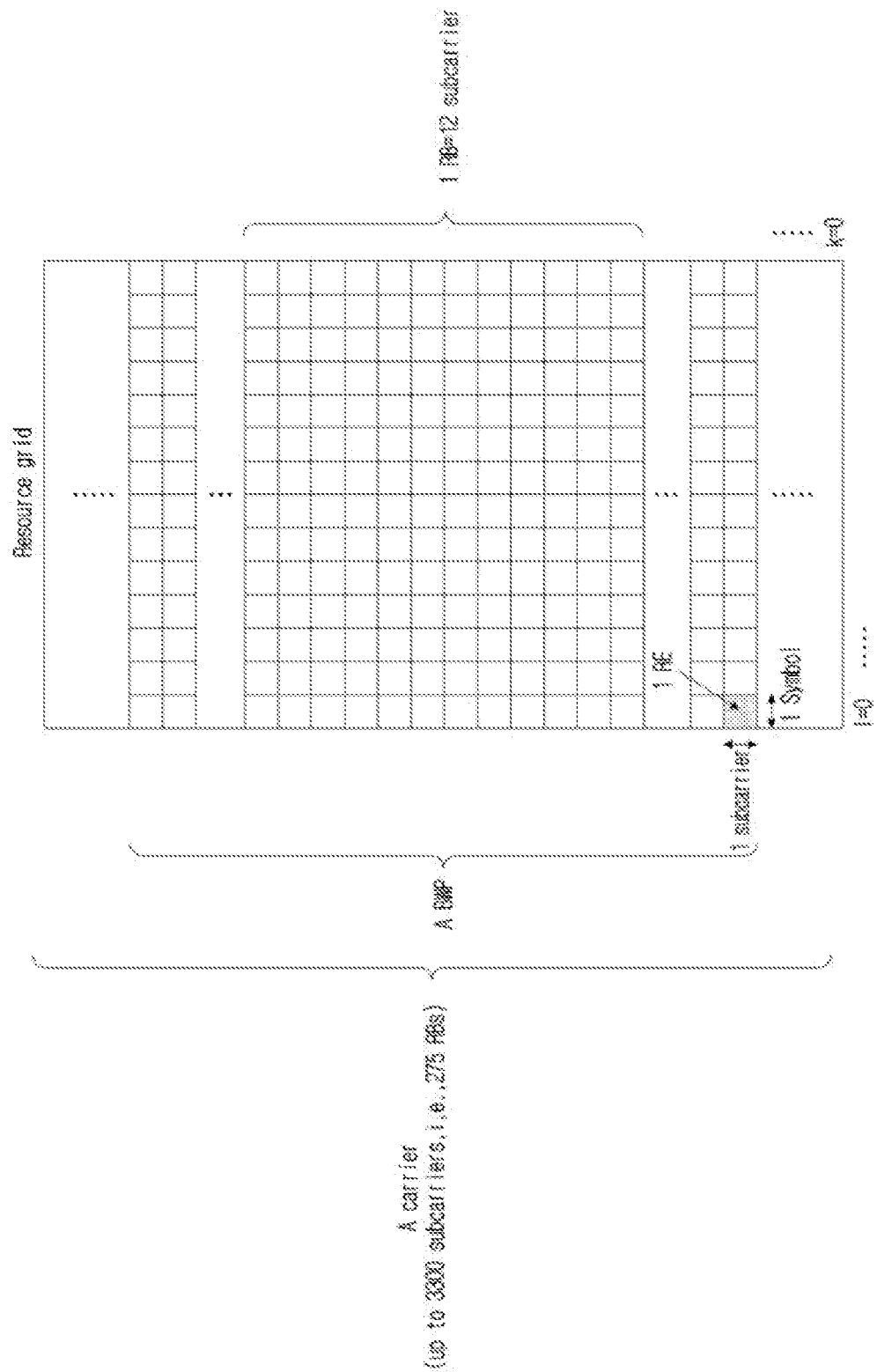
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
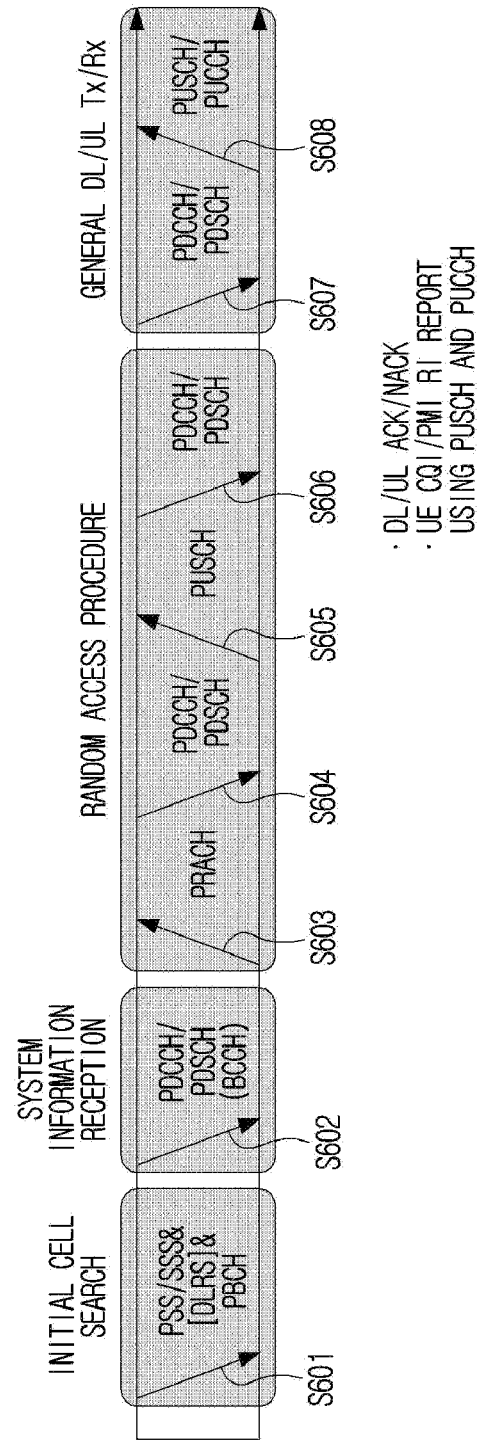
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgment/Non-Acknowledgment) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission(JT), coordinated Scheduling(CS), coordinated Beamforming (CB), dynamic Point Selection(DPS), dynamic Point Blocking(DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI(multiple DCI) that each TRP transmits different DCIs and ii) M-TRP transmission based on S-DCI(single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block(TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets(CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT(Non-coherent joint transmission) is a scheme in which a plurality of transmission points (TP) transmit data to one terminal by using the same time frequency resource, TPs transmit data by using a different DMRS(Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI(Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR(scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N(process/retransmission) for PDSCH/PUSCH, etc. scheduled per each TRP/panel may be managed per corresponding CORESET group (i.e., per TRP/panel belonging to the same CORESET group).

Hereinafter, a method for improving reliability in Multi-TRP will be described.

In addition, the NCJT may be divided into a fully overlapped NCJT in which the time frequency resources transmitted by each TP completely overlap and a partially overlapped NCJT in which only some time frequency resources are overlapped. That is, in the case of partially overlapped NCJT, both TP 1 and TP2 data are transmitted in some time frequency resources, and only one TP of TP 1 or TP 2 data is transmitted in the remaining time frequency resources.

Hereinafter, a method for improving reliability in Multi-TRP will be described.

The following two methods may be considered as a transmission/reception method for improving reliability using transmission in multiple TRPs.

Figure 7:
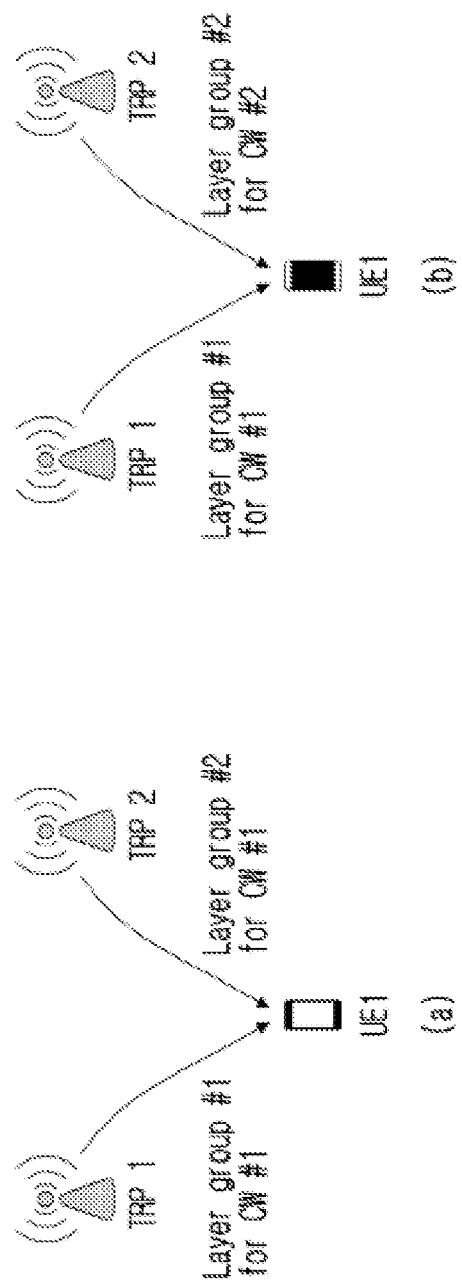
FIGS. 7A and 7B illustrate a method of transmitting multiple TRPs in a wireless communication system to which the present disclosure may be applied.

FIGS. 7A and 7B illustrate a method of multiple TRPs transmission in a wireless communication system to which the present disclosure may be applied.

In reference to FIG. 7A, it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7B, an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7B, it may have a disadvantage that a code rate corresponding to a TB is higher compared to FIG. 7A. However, it has an advantage that it may adjust a code rate by indicating a different RV (redundancy version) value or may adjust a modulation order of each CW for encoded bits generated from the same TB according to a channel environment.

According to the method illustrated in FIGS. 7A and 7B above, as the same TB is repeatedly transmitted through different layer groups and each layer group is transmitted by different TRP/panel, the data reception probability of the UE may be increased. This is referred to as a Spatial Division Multiplexing (SDM)-based M-TRP URLLC transmission scheme. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and frequency resource allocation is overlapped and n (n<=Ns) TCI states in a single slot
1-a) Method 1 a.
  The same TB is transmitted in one layer or layer set at each transmission time (occasion) and each layer or each layer set is associated with one TCI and one set of DMRS port(s).
  A single codeword having one RV is used in all spatial layers or all layer sets. With regard to UE, different coded bits are mapped to a different layer or layer set by using the same mapping rule
1-b) Method 1b
  The same TB is transmitted in one layer or layer set at each transmission time (occasion) and each layer or each layer set is associated with one TCI and one set of DMRS port(s).
  A single codeword having one RV is used in each spatial layer or each layer set. RV(s) corresponding to each spatial layer or each layer set may be the same or different.
1-c) Method 1c
  The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency resource allocation is not overlapped and n (n<=Nf) TCI states in a single slot
  Each non-overlapping frequency resource allocation is associated with one TCI state.
  The same single/multiple DMRS port(s) are associated with all non-overlapping frequency resource allocation.

2-a) Method 2a
  A single codeword having one RV is used for all resource allocation. With regard to UE, common RB matching (mapping of a codeword to a layer) is applied to all resource allocation.
2-b) Method 2b
  A single codeword having one RV is used for each non-overlapping frequency resource allocation. ARV corresponding to each non-overlapping frequency resource allocation may be the same or different.

For the above-described method 2a, the same MCS is applied to all non-overlapping frequency resource allocation.

3) Method 3 (TDM): Time resource allocation is not overlapped and n (n<=Nt1) TCI states in a single slot
  Each transmission time (occasion) of a TB has time granularity of a mini-slot and has one TCI and one RV.
  A common MCS is used with a single or multiple DMRS port(s) at all transmission time (occasion) in a slot.
  A RV/TCI may be the same or different at a different transmission time (occasion).

4) Method 4 (TDM): n (n<=Nt2) TCI states in K (n<=K) different slots
  Each transmission time (occasion) of a TB has one TCI and one RV.
  All transmission time (occasion) across K slots uses a common MCS with a single or multiple DMRS port(s).
  A RV/TCI may be the same or different at a different transmission time (occasion).

Basic Beam Failure Recovery (BFR)

The UE and/or the base station may perform uplink/downlink beam management (BM) for data transmission/reception. Here, BM may refer to a process of obtaining and maintaining a beam set that can be used for downlink and uplink transmission/reception.

Specifically, BM may include a beam measurement process of measuring the characteristics of a beamforming signal received from a base station or a UE, a beam determination process of determining a transmission beam (Tx beam) and a reception beam (Rx beam) of the base station or the terminal itself, a beam sweeping process of covering a spatial region using a transmit beam and/or a receive beam for a predetermined time interval in a predetermined manner, and a beam reporting process in which the UE reports information of the beam signal to the base station based on the beam measurement result.

While the above-described uplink/downlink BM process is performed, a beam mismatch problem may occur due to various factors. For example, when the UE moves or rotates, or when a radio channel environment is changed due to movement of a nearby object (e.g., when it was a line-of-sight (LoS) environment and then changed to a non-LoS environment as the beam was blocked), an optimal uplink/downlink beam pair may be changed. At this time, when the UE or the base station fails to track the changed optimal uplink/downlink beam pair (i.e., BM tracking), it may be considered that a beam failure has occurred.

The UE may determine whether beam failure has occurred based on the reception quality of a downlink reference signal (RS). In addition, the UE must report a report message on whether beam failure has occurred or a message for a beam recovery request (beam failure recovery request message, BFRQ message) to the base station. Upon receiving the message, the base station may perform a beam recovery process through various processes such as beam RS transmission or beam report request for beam recovery.

This series of beam recovery processes is called a beam failure recovery (BFR) process.

The basic BFR operation includes a BFR process for a special cell (SpCell) (i.e., a primary cell, PCell) or a primary secondary cell (PScell) in which a contention-based PRACH resource exists. The BFR process may consist of a beam failure detection (BFD) process of the UE, a BFRQ transmission process, and a process of monitoring the response of the base station to the BFRQ, and each process may be performed in a serving cell.

Beam Failure Detection (BFD)

When the quality value (Q_out) of all PDCCH beams falls below a predefined value, it may be considered that one beam failure instance has occurred. Here, the quality value may be determined based on a hypothetical block error rate (BLER). That is, the theoretical BLER may mean a probability that demodulation of the control information fails when the control information is transmitted on a specific PDCCH.

In addition, one or a plurality of search spaces for monitoring the PDCCH may be configured in the UE, and a PDCCH beam may be configured differently for each search space. In this case, when the quality values of all PDCCH beams fall below the predefined value, it means that the quality values of all PDCCH beams fall below the BLER threshold.

Two methods, which will be described later, may be supported as a method for the UE to receive an indication/configuration of a BFD-RS from the base station for determining whether a beam failure instance has occurred.

As a first method, an implicit configuration method of BFD-RS may be supported. A control resource set (CORESET) ID, which is a resource region in which the PDCCH may be transmitted, is configured in each search space, and RS information (e.g., CSI-RS resource ID, SSB ID) QCLed in terms of spatial RX parameters may be indicated/configured for each CORESET ID. In view of spatial reception parameters, the QCLed RS may be indicated or configured through transmit configuration information (TCI). That is, the BFD-RS may be implicitly configured/indicated to the UE based on QCL information indicated or configured through TCI.

Here, when the base station indicates or configures the RS (i.e., QCL Type D RS) that is QCL from the point of view of the spatial reception parameter to the UE, when the UE receives a specific PDCCH DMRS, the beam used for reception of the RS that is QCL from the point of view of the spatial reception parameter may be used. That is, a signal may be transmitted between spatially QCLed antenna ports through the same transmission beam or similar transmission beams (e.g., when beam widths are different while beam directions are the same/similar).

As a second method, an explicit configuration method of the BFD-RS may be supported. The base station may explicitly configure or indicate the UE to use the beam RS for BFD. In this case, the beam RS may correspond to the 'all PDCCH beams'.

The UE physical layer may inform the MAC sublayer that the BFI(beam failure instance) has occurred whenever an event in which the theoretical BLER measured based on the configured (or indicated) BFD-RS deteriorates beyond a specific threshold value occurs. In addition, the UE MAC sublayer may determine that a beam failure has occurred and initiate a related RACH operation when BFI occurs a predetermined number of times (e.g., 'beamFailureInstanceMaxCount') within a predetermined time (e.g., 'BFD timer').

Hereinafter, the operation of the MAC layer related to BFD will be described.

The MAC entity may:
1> if a beam failure instance indication is received from the lower layers:
2> starts or restarts beamFailureDetectionTimer
2> increment BFI_COUNTER by 1
2> if BFI_COUNTER>=beamFailureInstanceMaxCount: initiate a random access procedure on the SpCell
1> if beamFailureDetectionTimer expires; or
1> if beamFailureDetectionTimer, beamFailureInstanceMaxCount, or any of the reference signals used for beam failure detection is reconfigured by the upper layer
2> set BFI_COUNTER to 0
1> if the random access procedure is successfully completed:
2> set BFI_COUNTER to 0
2> stop (configured) beamFailureRecoveryTimer
2> consider that the beam failure recovery procedure has been successfully completed BFRQ (PRACH based): new beam identification and PRACH transmission As described above, when more than a certain number of BFIs are generated, the UE may determine that a beam failure has occurred, and may perform a beam failure recovery operation. The UE may perform a BFRQ process based on RACH (i.e., PRACH) as an example of a beam failure recovery operation. Hereinafter, the corresponding BFRQ process will be described in detail.

When a beam failure occurs, the base station may configure a candidate beam RS list ('candidateBeamRSList') including replaceable candidate beam RSs to the terminal through RRC signaling. And, the base station may configure a dedicated PRACH resource for the candidate beam RSs. In this case, the dedicated PRACH resource may be a non-contention based PRACH resource (or a contention free PRACH resource). When an alternative beam RS is not found in the candidate beam RS list, the UE may select at least one of preconfigured SSB resources. And, the UE may transmit a contention-based PRACH to the base station based on at least one selected. A detailed procedure for transmitting the contention-based PRACH is as follows.

The UE may determine a beam RS having a quality value Q_in equal to or greater than a predefined value among a plurality of beam RSs included in the candidate beam RS list configured by the base station (step 1). Here, the quality value of the beam RS may be determined based on reference signal received power (RSRP).

In addition, the candidate beam RS list configured by the base station to the UE may be configured of all SSBs, all of CSI-RS resources, or a combination of SSB and CSI-RS resources.

If the quality value of one beam RS among a plurality of beam RSs included in the candidate beam RS list exceeds a threshold value (i.e., a predefined value), the UE may select the beam RS. And, when the quality values of the plurality of beam RSs in the candidate beam RS list exceed the threshold, the UE may select any one of the plurality of beam RSs.

If there is no beam RS having a quality value exceeding a threshold among a plurality of beam RSs included in the candidate beam RS list, the UE may perform an operation according to step 2 to be described later.

The UE may determine a beam RS having a quality value (Q_in) greater than or equal to a predefined value among SSBs (connected to a contention based PRACH resource) (step 2).

If the quality value of one of the SSBs exceeds the threshold, the UE may select the SSB. And, when the quality value of the plurality of SSBs among the SSBs exceeds the threshold, the UE may select any one of the plurality of SSBs.

If there is no SSB whose quality value exceeds the threshold among the SSBs, the UE may perform an operation according to step 3 to be described later.

The UE may select any SSB from among the SSBs (connected to a contention based PRACH resource) (step 3).

In addition, the UE may transmit the PRACH resource and preamble configured to be directly or indirectly connected to the beam RS (CSI-RS or SSB) selected in the above step (step 1 or step 2) to the base station.

For example, when a contention-free PRACH resource and a preamble are configured for a beam RS in the candidate beam RS list for BFR, or, when a contention-based PRACH resource and a preamble are configured in SSBs that are universally configured such as random access, the UE may transmit the PRACH resource and preamble configured to be directly connected to the selected beam RS to the base station.

As another example, when no contention-free PRACH resource and preamble are configured for the CSI-RS in the candidate beam RS list for BFR, the UE may transmit the PRACH resource and preamble configured to be indirectly connected to the selected beam RS to the base station. Specifically, the UE may select a contention-free PRACH resource and preamble associated with an SSB indicated to be receivable with a reception beam corresponding to the corresponding CSI-RS (that is, QCLed for the spatial reception parameter) and transmit it to the base station.

Monitoring of gNB's response to the BFRQ

The UE may monitor the response of the base station to the PRACH and preamble transmission.

If the UE transmits a contention-free PRACH resource and a preamble to the base station, the base station may transmit a response to the UE through the PDCCH masked with the C-RNTI. The UE receives the response in a search space configured for BFR use (via RRC signaling). In this case, the search space is configured in a specific CORESET for BFR use.

And, when the UE transmits a contention-based PRACH and a preamble to the base station, the base station may transmit a response to the UE by reusing a CORESET (e.g., CORESET 0 or CORESET 1) and a search space configured for a random access procedure based on a contention-based PRACH.

If there is no response from the base station for a certain period of time (that is, if the response of the base station is not monitored for a certain period of time), the UE performs a new candidate beam identification and selection process, and repeats the process of monitoring the BFRQ and the response of the base station.

The above-described new candidate beam identification and selection process may be performed until the PRACH transmission is performed for a preconfigured maximum number of times N_max or until a configured timer (BFR timer) expires. When the timer expires, the UE may stop contention-free PRACH transmission or perform contention-based PRACH transmission by SSB selection until N_max is reached.

Enhanced Beam Failure Recovery

When carrier aggregation (CA) is applied, there may be no uplink (UL) carrier in a specific SCell. That is, in the case of an SCell having only a downlink carrier, uplink transmission is impossible. And, even if there is an uplink carrier in the SCell, the contention-based PRACH cannot be configured. Therefore, the PRACH-based BFR process to which CA is applied may be limitedly applied only to the SpCell (PCell or PSCell), and the BFR process may not be supported for the SCell. That is, according to the basic BFR operation, the PRACH-based BFR operation in the SpCell may not be supported in the SCell.

Specifically, when a high-frequency band requiring BFR is configured to the SCell, the PRACH-based BFR process may not be supported in the corresponding high-frequency band. For example, when the PCell is operated in a low frequency band (e.g., 6 GHz or less) and the SCell is operated in a high frequency band (e.g., 30 GHz), there is a problem that the PRACH-based BFR process is not supported in a high-frequency band that requires more BFR support.

In order to solve the above-mentioned problem, the improved BFR operation includes an operation for the BFR of the SCell. For example, the UE may perform BFRQ for the SCell by using a dedicated PUCCH resource for BFRQ configured in the SpCell. Hereinafter, the 'dedicated PUCCH resource' will be referred to as BFR-PUCCH for convenience of description.

The role of BFR-PRACH introduced in basic BFR is to report 'beam failure (beam failure, BF) occurrence information and new candidate beam RS (set) information' together to the base station. On the other hand, the role of the BFR-PUCCH is to report only 'BF occurrence information for the SCell' to the base station. Further, detailed information related to the generated BF may be transmitted to the base station through the BFR MAC-CE or UCI as a subsequent report.

Here, the detailed information transmitted as the subsequent report may include information on SCell(s) where BF occurred(e.g., CC (component carrier) index information), whether or not there is a new candidate beam for the SCell(s) in which BF has occurred, and when a new candidate beam exists, the corresponding beam RS ID.

In addition, the BFR-PUCCH may use the same PUCCH format as an SR (scheduling request), and may be defined through the ID of a specific SR for BFR use. If the UL-SCH allocated from the base station exists when the UE detects the BF for the SCell, the UE may omit the BFR-PUCCH transmission procedure like the SR transmission procedure, and transmit the BFR MAC-CE to the base station through the directly allocated UL-SCH.

Method of Performing TRP-Specific BFR in the MTRP Environment

When PRACH-based BFR operation is performed in multiple DCI-based NCJT environments among MTRP environments, BF occurred in all CORESETs belonging to a specific TRP, if there is a CORESET in which BF has not occurred among CORESETs belonging to other TRPs, the UE may determine that the current situation is not a BF situation.

At this time, if the TRP in which the BF occurred in all CORESETs is the TRP (e.g., the primary TRP) that was responsible for the transmission of important control information (e.g., SIB, RA, paging information, etc.), even if beam failure does not occur in a specific beam of another TRP (e.g., secondary TRP), a problem that the UE cannot receive the important control information may occur.

In order to solve the above-mentioned problem, a method of performing BFR only for a specific TRP may be applied. The operation of performing BFR only for a specific TRP may include a TRP-specific BFD operation, a TRP-specific BFRQ operation, an operation of receiving a response to the BFRQ from the base station, a BFR MAC-CE transmission operation, an operation of receiving a response to the BFR MAC-CE from the base station, and an operation of resetting the beam of a specific TRP to a new candidate beam.

First, the UE may perform a BFD operation only for a specific TRP (i.e., a TRP-specific BFD operation).

The UE may perform BFD on a CORESET group (or BFD RS set) associated with a specific TRP to which important information such as system information is to be transmitted. At this time, the CORESET group associated with a specific TRP (or BFD RS set) may be a preconfigured CORESET group (e.g., a CORESET group having a CORESET group ID of 0) or a CORESET group (or a BFD RS set) separately configured by the base station to perform BFD.

Specifically, the base station may implicitly configure a (BFD) RS to perform BFD to the UE. That is, if the base station does not explicitly set (BFD) RS to perform BFD, the UE may perform BFD only for (type D) QCL RS indicated by the TCI state corresponding to the CORESET group associated with a specific TRP.

Additionally or alternatively, the base station may explicitly configure one or more CORESET groups (or BFD RS sets) associated with a specific TRP to perform BFD to the UE. The UE may perform BFD in units of one or more configured CORESET groups (or BFD RS sets).

When detecting that BF has occurred in a specific TRP (or one of the CORESET groups associated with the specific TRP), the UE may transmit a TRP-specific BFRQ to the base station.

Specifically, the base station may configure a BFRQ resource (e.g., a scheduling request (SR) PUCCH resource) to the UE. That is, when BF occurs in a specific TRP, the UE may transmit the configured BFRQ (e.g., SR PUCCH) to the base station. At this time, the UE may transmit the BFRQ to the TRP in which the BF has not occurred. And, when transmitting the BFRQ, the UE may explicitly or implicitly report the BFRQ associated with which BFD RS set (or CORESET group) to the base station.

In addition, the base station may configure a separate BFRQ resource for each TRP, but is not limited thereto, and a plurality of TRPs may be configured to share one BFRQ resource. For example, when BFR for the SCell is performed, each TRP may share a BFRQ resource based on a plurality of spatial relation parameters.

The UE may receive a response to the BFRQ from the base station. Specifically, the UE may receive a response to the BFRQ including the uplink grant DCI from the base station that has received the BFRQ.

And, the UE may transmit the BFR MAC-CE to the base station. Specifically, the UE may transmit the BFR MAC-CE to the base station through the PUSCH scheduled by the received uplink grant DCI. In this case, the BFR MAC-CE may include the ID of the component carrier (CC) in which the BF has occurred, information on whether a new candidate beam has been found for in the CC, the ID of the found new candidate beam, and information on the TRP ID (e.g., CORESET group ID or BFD RS set ID, etc.) in which the BF has occurred.

The UE may receive a response to the BFR MAC-CE from the base station. Specifically, the response to the BFR MAC-CE may be a DCI indicating that the BFR MAC-CE has been normally received. At this time, the DCI is a DCI transmitted when the base station successfully decodes the PUSCH, and may include at least one of HARQ process ID, new data indicator (NDI), redundancy version (RV), and CGG transmission information (CBGTI).

The UE may reset the beam related to the TRP in which the BF has occurred as a new candidate beam. Specifically, a DCI indicating that the BFR MAC-CE has been normally received is received from the base station and after a certain time (e.g., 28 symbols), the UE may reset beam (e.g., PDDCH beam) related to the TRP that transmitted the DCI or the TRP that reported new candidate beam information through the BFR MAC-CE to the new candidate beam RS.

BFR Operation when BF Occurs in a Specific TRP or All TRPs

The enhanced BFR operation as described above may include BFR operation for one or more CC/BWP. While the BFR operation for one or more CC/BWP is performed, the BFR MAC-CE that the UE transmits to the base station may include information indicating whether the BFR operation is a BFR operation for an SpCell (i.e., a PCell or a PSCell) (e.g., a BFR operation based on a contention-based RACH for the SpCell) or a BFR operation for the SCell, CC/BWP list where BF occurred (beam failed CC/BWP list), information on whether a new candidate beam RS was found in each CC/BWP where BF occurred, and when a new candidate beam RS is found in the CC/BWP, the found new candidate beam RS ID, etc.

Here, if the size of the UL-SCH allocated to the UE is insufficient to transmit the BFR MAC-CE, the UE may transmit a BFR MAC-CE omitting some information (i.e., a truncated BFR MAC-CE) to the base station. For example, in the truncated BFR MAC-CE, information on whether or not a new candidate beam RS is found in the CC/BWP list where BF has occurred may be omitted, but is not limited thereto. The type of omitted information may be configured differently.

Additionally or alternatively, as described above, the UE may perform a BFR operation for each TRP (i.e., a TRP-specific BFR operation). The present disclosure includes embodiments of BFR schemes that can be applied to both when BF occurs for a specific TRP (e.g., a specific CORESET group or a specific BFD RS group) (hereinafter, 'event 1 occurrence') and BF occurs for all TRPs (hereinafter, 'event 2 occurrence') in a specific frequency band (e.g., CC/BWP). Here, event 2 may be considered as a BF event defined in the existing UE operation (e.g., Rel-15/16) in that BF occurred in the corresponding CC/BWP (that is, BF occurred in all TRPs of the CC/BWP).

Embodiment 1

When event 1 or event 2 occurs, the UE may use a BFRQ resource commonly configured for event 1 and event 2. In addition, the UE may report information on whether event 1 and/or event 2 has occurred to the base station.

Here, the BFRQ resource commonly configured for event 1 and event 2 may be a resource used for BFR for one or more CC/BWP. For example, the BFRQ resource may include a PUCCH resource configured for BFRQ use (i.e., a BFRQ-PUCCH resource). In this case, the BFRQ-PUCCH resource may use the same PUCCH format as a scheduling request (SR) included in uplink control information (UCI), and an SR ID for BFRQ may be configured.

The UE may reduce the overhead of a reserved uplink resource by using the BFRQ resource commonly configured for the event 1 and the event 2.

Here, the event 1 may be divided into detailed events according to the TRP (e.g., CORESET group or BFD RS group) index in which the BF occurred. For example, event 1 may be divided into event 1-1, which is a case where BF for TRP 1 occurs, and event 1-2, which is a case where BF for TRP 2 occurs. That is, information on whether event 1 has occurred may be divided into detailed events according to the occurrence of BF for each TRP and reported.

In addition, the information on whether the event 2 has occurred may be omitted based on the configuration of the information on whether the event 1 has occurred. For example, when BF occurs for both TRPs, the UE may omit information on whether event 2 occurs by reporting information that event 1-1 and event 1-2 have occurred.

Additionally or alternatively, information on whether event 1 or/and event 2, when event 1 occurs for a specific CC/BWP and event 2 occurs for another specific CC/BWP, may include an indicator indicating that both event 1 and event 2 have occurred.

For example, when the indicator is included in the information on whether event 1 and/or event 2 has occurred, the UE may separately report at least one of information on the CC/BWP in which the event 1 and the event 2 occur, information on whether a new candidate beam RS is found in the CC/BWP in which the BF occurs, or the new candidate beam RS ID information to the base station.

In addition, information on whether event 1 and/or event 2 has occurred may be reported by being included in a predefined BFR MAC-CE. That is, the UE may report to the base station by including information on whether the event 1 and/or event 2 has occurred on the MAC-CE for the BFR use.

Additionally or alternatively, a separate MAC-CE may be defined for each event 1 (or a detailed event according to event 1) and event 2. Accordingly, when a specific event occurs, the UE may report the MAC-CE corresponding to the specific event (i.e., MAC-CE defined in the specific event) to the base station. And, the base station may determine what event has occurred through the reported format/header of the MAC-CE.

For example, when event 2 occurs, the UE may report a predefined BFR MAC-CE to the base station or may report a MAC-CE separately defined in event 2 to the base station.

And, when the MAC-CE is separately defined for each event, the TRP for reporting the MAC-CE for a specific event may be separately limited (or configured). For example, when a MAC-CE is reported as a TRP in which BF has occurred, there may be a high probability that the TRP cannot decode the corresponding MAC-CE. Therefore, the UE may be limited (or configured) to report the corresponding MAC-CE only to the TRP in which the BF does not occur.

In addition, the (TRP-specific) MAC-CE generation/trigger method may be changed so that the TRP for which the UE reports the (TRP-specific) MAC-CE is limited (configured).

For example, the (TRP-specific) BFR MAC-CE may be generated/triggered only when there is a UL-SCH for the TRP for which no BF has occurred (i.e., if available).

As another example, when a scheduling DCI/grant is received from a TRP (e.g., CORESET group, etc.) for which no BF has occurred (i.e., when BF is implicitly detected), or when the PDCCH/PDSCH TCI is included in the DL RS on the TRP for which no BF has occurred (i.e., when BF is explicitly detected) (TRP-specific), BFR MAC-CE may be generated/triggered.

In reporting information on whether event 1 or/and event 2 occurs to the base station, the UE may define whether each event occurs as an individual state (i.e., BF state). In addition, the UE may report a BF status corresponding to each CC/BWP in which BF occurs among CCs/BWPs (which performs BFR using the same BFRQ resource) to the base station.

Here, the bit width of the BF state may vary according to the number of TRPs. For example, when the number of TRPs is 3, the BF state may consist of 2 bits as shown in Table 6 below. In Table 6, that BF occurred in TRP #X may mean that BF occurred in CORESET group #x or BFD RS group #x.

TABLE 6

| BF state | Description |
|---|---|
| 00 | Event2 (if BF occurs in all TRPs) |
| 01 | Event1-1 (that is, if BF occurs only in TRP #0) |
| 10 | Event1-2 (that is, if BF occurs only in TRP #1) |
| 11 | Event1-3 (that is, if BF occurs only in TRP #2) |

As another example, the UE may indicate whether each event occurs using a BF bitmap instead of a BF state. Specifically, the UE may map a value indicating whether BF occurs to each bit of the BF bitmap in the order of the TRP ID of a specific CC/BWP. For example, if the bit corresponding to TRP #1 in the BF bitmap is 1, it means that BF has occurred for TRP #1, and when the bit is 0, it may mean that BF has not occurred for TRP #1. And, if BF occurs for all TRPs (that is, event 2 occurs), since 1 is mapped to every bit included in the BF bitmap, a separate identifier for indicating whether event 2 has occurred may not be necessary.

Additionally or alternatively, the UE may map a value indicating whether BF occurs to each bit of the BF bitmap in the order of the CORESET pool index value associated with the CORESET of a specific CC/BWP, and report the BF bitmap to the base station.

As described above, when reporting BF state or BF bitmap for each CC/BWP (or CC BWP in which BF occurs among CC/BWP), the BFR MAC-CE reported to the base station may include information on whether the BFR operation is a BFR operation for the SpCell or a BFR operation for the SCell, CC/BWP list where BF occurred, BF state or BF bitmap for CC/BWP where BF occurred, information on whether a new candidate beam RS was found in each of the BF status or BF bitmap CC/BWP where BF occurred for the CC/BWP where BF occurred, and when a new candidate beam RS is found in the CC/BWP, the found new candidate beam RS ID etc.

At this time, with respect to the CC/BWP list in which the BF has occurred, the UE may report the CC/BWP in which the beam failure occurs not only when the event 2 occurs but also for the CC/BWP where the event 1 occurs.

Additionally or alternatively, the BF state and the BF bitmap may be information indicating whether BF occurs in all CCs/BWPs reported by the UE, rather than being reported for each CC/BWP.

At this time, the BFR MAC-CE reported to the base station may include information on whether the BFR operation is a BFR operation for the SpCell or a BFR operation for the SCell, BF status or BF bitmap, CC/BWP list where BF occurred, information on whether a new candidate beam RS was found in each CC/BWP where BF occurred, and when a new candidate beam RS is found in the CC/BWP, the found new candidate beam RS ID, etc.

In this case, the CC/BWP list in which the BF has occurred may include only the CC/BWP list in which the BF state or an event reported through the BF bitmap has occurred. For example, when it is reported that BF has occurred for TRP #0 using the BF status or BF bitmap, the list in which BF has occurred may include only the CC/BWP list in which BF has occurred for TRP #0.

Additionally or alternatively, the BF state or BF bitmap may be extended so that a plurality of BF statuses or BF bitmaps indicating whether BF has occurred for each CC/BWP may be reported together. For example, the BF state may be extended to include a state indicating that event 1 has occurred in a specific CC/BWP and event 2 has occurred in another CC/BWP.

At this time, the BFR MAC-CE reported to the base station may include information on whether the BFR operation is a BFR operation for the SpCell or a BFR operation for the SCell(s), BF state or BF bitmap, CC/BWP list where BF occurred, information on whether a new candidate beam RS was found in each CC/BWP where BF occurred, and when a new candidate beam RS is found in the CC/BWP, the found new candidate beam RS ID etc.

Here, the BF state or the size of the BF bitmap may vary. Accordingly, a field indicating the BF state or the size of the BF bitmap may be added to the BFR MAC-CE.

As another example, the BF state or the size of the BF bitmap may be fixed according to the number of occurrence/reportable events. At this time, if an event does not occur (or BF does not occur), it may be configured to include a predefined value indicating that an event does not occur in a field indicating the BF state or BF bitmap among BFR MAC-CEs.

In addition, the CC/BWP list in which the BF has occurred may be determined according to the number of events reported through the BF state or BF bitmap information. For example, when the 'BF occurrence and all TRP occurrences in TRP #0' situation is reported using the BF status or BF bitmap, the CC/BWP list in which BF occurs may include a list of CC/BWP in which TRP #0 BF occurs and a list of CC/BWP in which all TRP BFs occur.

And, the field size of the information on whether or not a new candidate beam RS is found in each CC/BWP in which the BF has occurred and the field size of the new candidate beam RS ID may be configured to the number of CCs/BWPs that have occurred even in one event, or may be configured separately according to an event that has occurred.

For example, it is assumed that, as carrier aggregation (CA) is applied, CC #0 to CC #4 are configured, BFs for TRP #0 occur in CC #0 and CC #3, and BFs for all TRPs occur in CC #1. Information on whether or not a new candidate beam RS is found in each CC/BWP in which the BF has occurred and the new candidate beam RS ID may be configured in order of CC #0, CC #1, and CC #3, or may be configured for each event. Here, that the information is configured for each event may mean that information on CC #0 and CC #3 corresponding to event 1 (that is, information on whether a new candidate beam RS was found in CC #0 and CC #3 and a new candidate beam RS ID) is configured and reported, and information on CC #1 corresponding to event 2 is configured and reported.

Embodiment 1-1

The size of the CC/BWP list reported by the UE may be configured to the number of CC/BWP in which an event may occur among all CC/BWP performing BFD while sharing BFRQ resources.

When CA is applied, all CCs may be configured to either MTRP or STRP, but some CCs may be configured to MTRP and some CCs may be configured to STRP. If the latter is configured (i.e., some CCs are configured to MTRP and some others are configured to STRP) and BF occurs for all TRPs, BF occurrence in some CCs configured to STRP may be considered as BF occurring in a specific TRP (i.e., the occurrence of event 1), or BF occurring in all TRPs (i.e., the occurrence of event 2). That is, the size of the CC/BWP list reported by the UE may vary depending on whether BF occurrence in some CCs configured to STRP is considered as a specific TRP BF occurrence or as all TRP BF occurrences. Therefore, embodiment 1-1 includes a method of configuring the size of the entire CC/BWP list reported by the UE to the number of CCs/BWPs in which a specific event may occur.

Specifically, when BF occurs in a specific TRP (e.g., BFD RS set), the size of the CC/BWP list reported by the UE may be determined by the number of CCs/BWPs including the specific TRP ID (or BFD RS set ID) among all CCs/BWPs in which BFD is performed/configured while sharing BFRQ resources.

And, if BF occurs in all TRPs, the size of the CC/BWP list reported by the UE may be determined by 1) the total number of CCs/BWPs in which BFD is performed/configured while sharing BFRQ resources or 2) the number of CC/BWP including all BFD RS set IDs among the entire CC/BWP (that is, including the BFD RS set commonly configured for each TRP).

That BF occurred for a specific TRP (event 1 occurs) in the CC/BWP configured only to a specific TRP (i.e., STRP) may be interpreted as the same as that BF occurred for all TRPs (event 2 occurs) in the CC/BWP. Therefore, the size of the CC/BWP list to be reported by the UE may be determined depending on whether to interpret 'BF occurrence for all TRPs' in a narrow meaning (method 2) or in a broad meaning (method 1) above.

For example, it is assumed that among CC #0 to CC #5, CC #0 to CC #4 are configured for the BFD RS set for TRP #0, and CC #3 to CC #5 are configured for the BFD RS set for TRP #1.

When the size of the CC list to be reported by the UE is determined based on the total number of CCs for which BFD is performed/configured (i.e., according to the method 1) above), the size of the CC list for event 2 may be 6 (CC #0 to CC #5). And, when the size of the CC list to be reported by the UE is determined by the number of CCs including all BFD RS set IDs among all CCs (i.e., the above 2) method), the size of the CC list for event 2 may be 2 (CC #3 and CC #4).

When the method 1) above is applied, the CC size for event 1 may be configured as 2 (CC #3 and CC #4). At this time, the occurrence of BF in CCs (CC #0, CC #1, CC #2, and CC #5) operating in STRP may be interpreted as event 2 occurring.

And, when the method 2) is applied, the CC size for event 1 may be configured as 6 (CC #0 to CC #5). At this time, the BF report for the CC operating in the STRP may be interpreted as a TRP-specific BF report. For example, the size of the CC list for the BF of TRP #0 in event 1 is 5 (CC #0 to CC #4), the size of the CC list for the BF of TRP #1 in event 1 may include 3 (CC #3 to CC #5).

In Examples 1 and 1-1, the case in which the UE uses the BFRQ resource commonly configured for the event 1 and the event 2 has been described. However, this is only an embodiment, and the UE may use a BFRQ resource (e.g., PUCCH resource/sequence) configured separately for each of event 1 and event 2. In order to reduce the size of the CC/BWP list reported by the UE even when a method using a separately configured BFRQ resource is applied to each of the event 1 and event 2, the above-described embodiment 1-1 may be applied.

Embodiment 2

The UE may use different BFRQ resources for event 1 (or detailed event of event 1) and event 2. And, the size of the CC/BWP list for each BFRQ resource may be defined as the number of CCs/BWPs in which a specific event may occur among all CCs/BWPs in which BFD is performed/configured while sharing the BFRQ resources.

As described in embodiment 1-1, a size of the CC/BWP list reported using the BFRQ resource for event 2 may be determined as 1) the total number of CCs/BWPs in which BFD is performed/configured while sharing the BFRQ resources or 2) the number of CCs/BWPs including all BFD RS set IDs among the entire CC/BWP (that is, including a BFD RS set commonly configured for each TRP).

For example, it is assumed that among CC #0 to CC #5, CC #0 to CC #4 are configured for the BFD RS set for TRP #0, and CC #3 to CC #5 are configured for the BFD RS set for TRP #1.

When the size of the CC list to be reported by the UE is determined based on the total number of CCs for which BFD is performed/configured (i.e., according to the method 1) above), the size of the CC list for event 2 may be 6 (CC #0 to CC #5). And, when the size of the CC list to be reported by the UE is determined by the number of CCs including all BFD RS set IDs among all CCs (i.e., the above 2) method), the size of the CC list for event 2 may be 2 (CC #3 and CC #4).

When the method 1) above is applied, the CC size for event 1 may be configured as 2 (CC #3 and CC #4). At this time, the occurrence of BF in CCs (CC #0, CC #1, CC #2, and CC #5) operating in STRP may be interpreted as event 2 occurring.

And, when the method 2) is applied, the CC size for event 1 may be configured as 6 (CC #0 to CC #5). At this time, the BF report for the CC operating in the STRP may be interpreted as a TRP-specific BF report. For example, the size of the CC list for the BF of TRP #0 in event 1 is 5 (CC #0 to CC #4), and the size of the CC list for the BF of TRP #1 in event 1 may include 3 (CC #3 to CC #5).

Embodiments 1 and 2 have been described with reference to a plurality of TRPs, but this may be equally applied to transmission through a plurality of panels. In addition, Embodiments 1 and 2 may be applied independently, but may be applied in combination with the above-described BFR operation.

Figure 8:
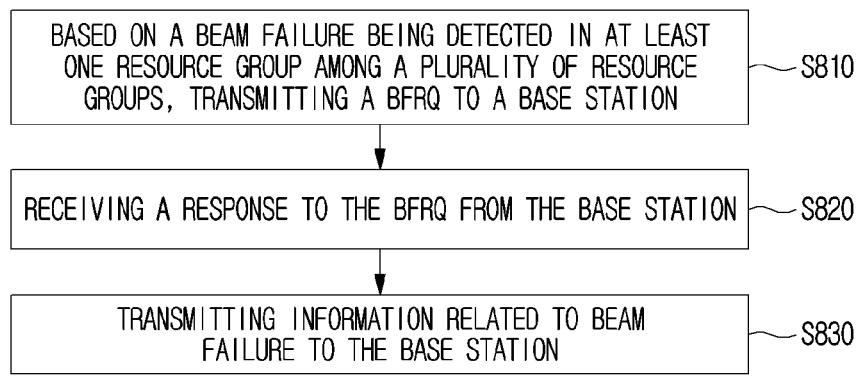
FIG. 8 is a diagram for describing a beam failure recovery operation of a terminal according to an embodiment of the present disclosure.

FIG. 8 is a diagram for explaining a beam failure recovery operation of a UE according to an embodiment of the present disclosure.

Based on a beam failure (BF) being detected in at least one resource group among a plurality of resource groups, the UE may transmit a beam failure recovery request (BFRQ) to the base station S810.

Here, the resource group may include at least one of a control resource set (CORESET) group or a beam failure detection (BFD) reference signal (RS) group. Each of the CORESET group or the BFD RS group may correspond to the TRP. For example, CORESET group 1 or BFD RS group 1 may correspond to TRP 1, and CORESET group 2 or BFD RS group 2 may correspond to TRP 2.

Here, the CORESET group includes one or more CORESETs, and a resource group may be configured based on a transmission configuration indicator (TCI) state configured for the one or more CORESETs. That is, the BFD RS for performing beam failure detection may be implicitly configured based on the TCI state configured for CORESET. And, the UE may detect beam failure in at least one resource group through the configured BFD RS.

Transmitting the BFRQ to the base station may mean transmitting the BFRQ to the base station through the BFRQ resource. In this case, the BFRQ resource may be configured in common in at least one frequency band (e.g., a component carrier (CC) or a bandwidth part). Specifically, based on a beam failure being detected in a specific resource group or a plurality of resource groups, the UE may transmit a BFRQ to the base station through a BFRQ resource commonly configured for beam failure in a specific resource group and beam failure in a plurality of resource groups.

In another embodiment of the present disclosure, when beam failure is detected in a specific resource group and when beam failure is detected in a plurality of resource groups, BFRQ resources corresponding to each may be different. For example, a first BFRQ resource may be configured for beam failure in a specific resource group and a second BFRQ resource may be configured for beam failure in a plurality of resource groups. And, based on beam failure occurring in a specific resource group, the UE may transmit the first BFRQ of BFRQ to the base station through the first BFRQ resource among the BFRQ resources. And, based on beam failure occurring in a plurality of resource groups, the UE may transmit the second BFRQ of the BFRQ to the base station through a second BFRQ resource different from the first BFRQ resource among the BFRQ resources.

In addition, available uplink resources (e.g., UL-SCH resources, PUSCH resources, etc.) may be configured (or allocated) for the UE. Based on the existence of available uplink resources, the UE may transmit information related to beam failure to the base station through the available uplink resources without performing the operation of transmitting the BFRQ to the base station and the operation of receiving the response to the BFRQ from the base station. That is, when the available uplink resources are allocated to the UE in advance, the UE may omit the BFRQ transmission operation and the BFRQ response reception operation and transmit information related to beam failure to the base station using the allocated available uplink resources.

The UE may receive a response to the BFRQ from the base station S820. The response to the BFRQ may include an uplink grant. The UE may transmit a PUSCH scheduled by DCI including the uplink grant to the base station.

The UE may transmit information related to beam failure to the base station S830. Here, the information related to beam failure may indicate a specific resource group in which beam failure is detected or a plurality of resource groups in which beam failure is detected. For example, information related to beam failure may include information on whether beam failure is detected in a specific TRP or beam failure is detected in a plurality of TRPs including the specific TRP.

And, whether beam failure is detected in a specific TRP or whether beam failure is detected in a plurality of TRPs may be defined as a separate BF state. The bit width of the BF state may be varied according to the number of TRPs. As another example, whether beam failure is detected in a specific TRP or whether beam failure is detected in a plurality of TRPs may be defined as a separate BF bitmap.

In addition, information related to the beam failure may include at least one of a type of cell in which the beam failure is detected, index information of at least one frequency band in which beam failure is detected, information on whether a new candidate beam RS exists in at least one frequency band in which the beam failure is detected, or information indicating the new candidate beam RS based on the existence of the candidate beam RS.

Here, the type of cell in which the beam failure is detected may indicate whether the cell in which the beam failure is detected is an SpCell or an SCell. In addition, the information on the new candidate beam RS may include ID information of the new candidate beam RS when a new candidate beam RS exists in at least one frequency band in which beam failure is detected.

And, based on beam failure being detected in a plurality of resource groups, the size of at least one frequency band in which the beam failure is detected may be determined based on the size of the entire frequency band in which BFD is performed or the size of the frequency band including identifications (IDs) of a plurality of resource groups among the entire frequency band in which BFD is performed.

For example, it is assumed that among CC #0 to CC #5, CC #0 to CC #4 are configured for the BFD RS set for TRP #0, CC #3 to CC #5 are configured for the BFD RS set for TRP #1, and beam failure occurs throughout all TRPs.

When the size of a frequency band (e.g., CC or BWP) in which a beam failure to be reported by the UE is detected is determined based on the total number of CCs in which BFD is performed, the size of the CC in which the beam failure is detected may be configured as 6 (CC #0 to CC #5). And, when the size of the CC in which the beam failure to be reported by the UE is determined is determined by the number of CCs including a plurality of resource group IDs among all CCs that have performed BFD, the size of the CC where the beam failure occurs may be configured as 2 (CC #3 and CC #4).

Additionally or alternatively, information related to beam failure may indicate a specific resource group in which beam failure is detected or a plurality of resource groups in which beam failure is detected for each at least one frequency band in which beam failure is detected.

Specifically, the information related to beam failure may indicate a specific resource group in which beam failure is detected or a plurality of resource groups in which beam failure is detected in a first frequency band among at least one frequency band, and indicate a specific resource group in which beam failure is detected or a plurality of resource groups in which beam failure is detected in a second frequency band among at least one frequency band.

For example, it is assumed that beam failure is detected in component carrier (CC) 1 and CC 2. At this time, information related to beam failure may indicate whether beam failure is detected in a specific TRP or a plurality of TRPs including the specific TRP in each of CC 1 and CC 2. And, whether beam failure is detected in a specific TRP or a plurality of TRPs including the specific TRP, as described above, may be indicated through a BF state or a BF bitmap.

Information related to beam failure may be included in one MAC-CE (e.g., BFR MAC-CE) or a plurality of MAC-CEs configured for BFR and transmitted to the base station. Specifically, information indicating a specific resource group in which beam failure is detected or a plurality of resource groups in which beam failure is detected may be included in one MAC-CE and transmitted to the base station.

Here, at least one of 1) the type of cell in which the beam failure is detected, 2) index information of at least one frequency band in which the beam failure is detected, 3) information on whether a new candidate beam RS exists in at least one frequency band in which the beam failure is detected, or 4) information indicating the new candidate beam RS based on the existence of the candidate beam RS (e.g., ID of the new candidate beam RS) may be included in the single MAC-CE and transmitted. However, it is not limited thereto, and the one MAC-CE may include only information indicating a specific resource group in which beam failure is detected or a plurality of resource groups in which beam failure is detected, and 1) to 4) described above may be separately transmitted to the base station.

Additionally or alternatively, information related to beam failure may be included in a plurality of MAC-CEs and transmitted to the base station. Specifically, when beam failure is detected in a specific resource group and when beam failure is detected in a plurality of resource groups, MAC-CEs corresponding to each may be separately defined.

For example, the plurality of MAC-CEs may include a first MAC-CE and a second MAC-CE. And, based on beam failure being detected in a specific resource group, information related to beam failure may be included in the first MAC-CE and transmitted to the base station. And, based on beam failure being detected in a plurality of resource groups, information related to beam failure may be included in the second MAC-CE and transmitted to the base station.

Additionally or alternatively, information related to beam failure may be transmitted to a resource group in which beam failure is not detected. For example, based on information related to beam failure being included in one MAC-CE (e.g., BFR MAC-CE) or a plurality of MAC-CEs (e.g., first MAC-CE or second MAC-CE), the UE may transmit the one MAC-CE or the plurality of MAC-CEs to a resource group in which beam failure is not detected. In the case of a resource group in which beam failure is detected, information included in the MAC-CE may not be decoded. Accordingly, the UE may transmit one MAC-CE or a plurality of MAC-CEs including information related to beam failure to a resource group in which beam failure is not detected.

Figure 9:
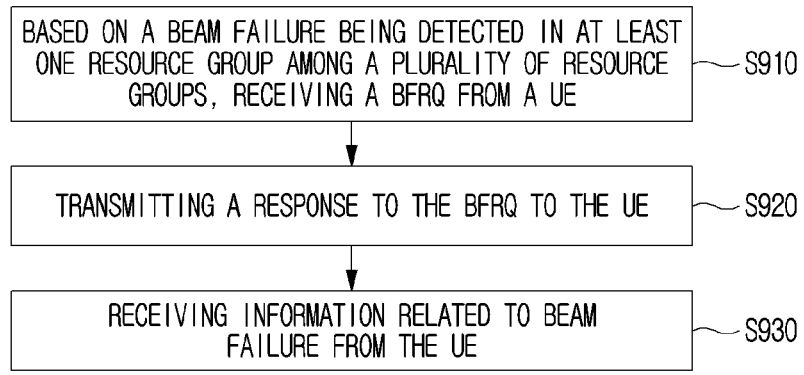
FIG. 9 is a diagram for describing a beam failure recovery operation of a base station according to an embodiment of the present disclosure.

FIG. 9 is a diagram for describing a beam failure recovery operation of a base station according to an embodiment of the present disclosure.

Based on beam failure (BF) being detected in at least one resource group among a plurality of resource groups, the base station may receive a beam failure recovery request (BFRQ) from the UE S910.

Here, a detailed example of the resource group and the BFRQ resource is the same as the example described with respect to step S810 of FIG. 8, and thus overlapping will be omitted.

The base station may transmit a response to the BFRQ to the UE S920. The response to the BFRQ may include an uplink grant. The base station may receive the PUSCH scheduled by DCI including the uplink grant from the UE.

The base station may receive information related to beam failure from the UE S930. Here, an example of information related to beam failure is the same as the example described with respect to step S820 of FIG. 8, and thus overlapping will be omitted.

Specifically, the base station may receive one MAC-CE (e.g., BFR MAC-CE) or a plurality of MAC-CEs configured for BFR use including information related to beam failure from the UE.

Here, an example related to one MAC-CE or a plurality of MAC-CEs is the same as the example described with respect to step S830 of FIG. 8, and thus overlapping will be omitted.

Figure 10:
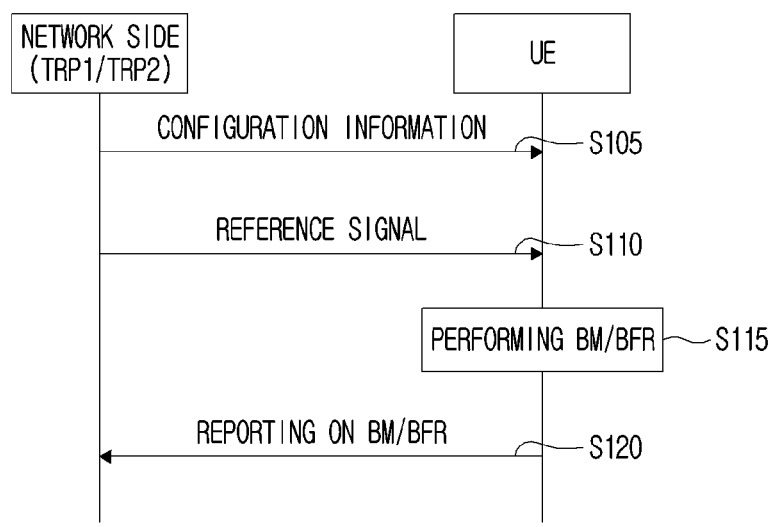
FIG. 10 is a diagram for describing a signaling procedure of a network side and a terminal according to the present disclosure.

FIG. 10 is a diagram for describing a signaling procedure of the network side and the UE according to the present disclosure.

FIG. 10 shows an example of signaling between a network side and a UE in an M-TRP situation to which embodiments of the present disclosure described above (e.g., a combination of one or more of embodiment 1, embodiment 1-1, embodiment 2, or detailed embodiments thereof) may be applied. Here, UE/a network side is illustrative and may be applied by being substituted with a variety of devices as described by referring to FIG. 11. FIG. 10 is for convenience of description, and it does not limit a scope of the present disclosure. In addition, some step(s) shown in FIG. 10 may be omitted according to a situation and/or a configuration, etc. In addition, the above-described uplink transmission and reception operation, a M-TRP-related operation, etc. may be referred to or used for an operation of a network side/UE in FIG. 10.

In the following description, a network side may be one base station including a plurality of TRPs or may be one cell including a plurality of TRPs. Alternatively, a network side may include a plurality of RRHs(remote radio head)/RRUs (remote radio unit). In an example, an ideal/non-ideal backhaul may be configured between TRP 1 and TRP 2 configuring a network side. In addition, the following description is described based on a plurality of TRPs, but it may be equally extended and applied to transmission through a plurality of panels/cells and may be extended and applied to transmission through a plurality of RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station(gNB, etc.), etc. As described above, a TRP may be classified according to information on a CORESET group (or a CORESET pool) (e.g., a CORESET index, an ID). In an example, when one UE is configured to perform transmission and reception with a plurality of TRPs (or cells), it may mean that a plurality of CORESET groups (or CORESET pools) are configured for one UE. A configuration on such a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one TP(Transmission Point), at least one TRP(Transmission and Reception Point), etc. In addition, a TP and/or a TRP may include a panel, a transmission and reception unit, etc. of a base station.

The UE may receive configuration information through/using TRP1 and/or TRP2 from the network side S105. The configuration information may include system information (SI), scheduling information, CSI-related configuration (e.g., CSI report configuration, CSI-RS resource configuration), and the like. The configuration information may include information related to a network-side configuration (i.e., TRP configuration), resource allocation information related to MTRP-based transmission and reception, and the like. The configuration information may be transmitted through a higher layer (e.g., RRC, MAC CE). In addition, when the configuration information is predefined or configured, the corresponding step may be omitted.

For example, as in the above-described embodiment (e.g., Embodiment 1, Embodiment 1-1, Embodiment 2, or a combination of one or more of detailed examples), the configuration information may include CORESET-related configuration information (e.g., ControlResourceSet IE). The CORESET-related configuration information may include a CORESET-related ID (e.g., controlResource-SetID), an index of the CORESET pool for CORESET (e.g., CORESETPoolIndex), time/frequency resource configuration of CORESET, TCI information related to CORESET, etc. For example, the configuration information may include information related to beam management/BFR, etc. as described in the above-described embodiments (e.g., embodiment 1, embodiment 1-1, embodiment 2, or a combination of one or more of detailed embodiments thereof).

For example, an operation that UE (100 or 200 in FIG. 11) in the above-described stage S105 receives the configuration information from a network side (200 or 100 in FIG. 11) may be implemented by a device in FIG. 11 which will be described after. For example, in reference to FIG. 11, at least one processor 102 may control at least one transceiver 106 and/or at least one memory 104, etc. to receive the configuration information and at least one transceiver 106 may receive the configuration information from a network side.

The UE may transmit a reference signal for UL transmission through/using TRP 1 and/or TRP 2 to the network side S110. For example, the UE may receive RS 1 and/or RS 2 for beam management/BFD via/using TRP1 and/or TRP 2 to the network side.

For example, an operation that UE (100 or 200 in FIG. 11) in the above-described stage S110 transmits the reference signal to a network side (200 or 100 in FIG. 11) may be implemented by a device in FIG. 11 which will be described after. For example, in reference to FIG. 11, at least one processor 102 may control at least one transceiver 106 and/or at least one memory 104, etc. to transmit the reference signal and at least one transceiver 106 may transmit the reference signal to a network side.

The UE may perform beam management/BFR based on RS 1 and/or RS 2 through/using TRP 1 and/or TRP 2 from the network side (S115). For example, the beam management/BFR performing method may be performed based on the above-described embodiment (e.g., embodiment 1, embodiment 1-1, embodiment 2, or a combination of one or more of detailed examples thereof). For example, the UE may measure/estimate a hypothetical BLER based on the reception quality of RS 1 and/or RS 2, and may determine BF accordingly.

For example, the operation of performing beam management/BFR by the UE (100 or 200 in FIG. 11) of step S115 described above may be implemented by the apparatus of FIG. 11. For example, referring to FIG. 11, one or more processors 102 may control one or more memories 104 to perform the beam management/BFR operation.

The UE may transmit the beam management/BFR report (e.g., BFRQ) to the network side through/using TRP 1 and/or TRP2 S120. In this case, the beam management/BFR report for TRP 1 (e.g., BFRQ, etc.) and the beam management/BFR report for TRP 2 (e.g., BFRQ, etc.) may be transmitted respectively or may be combined into one. In addition, the UE is configured to transmit a report (e.g., BFRQ, etc.) for beam management/BFR to the representative TRP (e.g., TRP 1), and a report (e.g., BFRQ, etc.) transmission for beam management/BFR to another TRP (e.g., TRP 2) may be omitted. Alternatively, the UE may be configured to transmit a BFR report (e.g., BFRQ, etc.) in the same TRP as the TRP in which the beam failure occurred. Alternatively, the UE may be configured to transmit a BFR report (e.g., BFRQ, etc.) to the TRP rather than the TRP in which the beam failure occurred.

For example, the beam management/BFR report (e.g., BFRQ, etc.) may be performed based on the above-described embodiment (e.g., embodiment 1, embodiment 1-1, embodiment 2, or a combination of one or more of detailed examples thereof). For example, when BF occurs for a specific TRP (e.g., event 1) and when BF for all TRPs occurs (e.g., event 2) may be reported respectively. In addition, BFR may be performed for a plurality of serving cells/BWP. For example, the beam management/BFR report (e.g., BFRQ, etc.) may be transmitted based on the BFR MAC CE.

For example, BFR MAC CE may include whether it is BFR for SpCell or BFR for SCell(s), CC/BWP list where beam failure occurred, whether a new candidate beam RS was found in the CC/BWP where BF occurred, a new candidate beam RS ID found in the CC/BWP where the BF occurred, and indication information for when BF occurs for a specific TRP (e.g., event 1) and/or when BF for all TRPs occurs (e.g., event 2) etc. For example, the indication information may be configured in a form indicating any one of a bitmap form or predefined states.

For example, the network side that receives a report/BFRQ for BF through/using TRP 1 and/or TRP 2 from the UE may transmit new BM/BFR-related RS information for beam recovery to the UE.

For example, the operation of the UE (100/200 in FIG. 11) of the above-described step S120 transmitting a report on beam management/BFR (e.g., BFRQ, etc.) from the network side (100/200 in FIG. 11) may be implemented by the apparatus of FIG. 11 to be described below. For example, referring to FIG. 11, one or more processors 102 may control one or more transceivers 106 and/or one or more memories 104 to transmit a report (e.g., BFRQ, etc.) for beam management/BFR, etc., and the one or more transceivers 106 may transmit a beam management/BFR report (e.g., BFRQ, etc.) to the network side.

Through the beam determined based on the above-described process, the UE may receive DCI 1 and data 1 scheduled by the corresponding DCI 1 through/using TRP 1 from the network side. In addition, the UE may receive DCI 2 and data 2 scheduled by the corresponding DCI 2 through/using TRP 2 from the network side. DCI (e.g., DCI 1, DCI 2) and data (e.g., data 1, data 2) may be transmitted through a control channel (e.g., PDCCH, etc.) and a data channel (e.g., PDSCH, etc.), respectively. For example, the DCI 1 may be received based on a first CORESET in which CORESETPoolindex is configured to 0 or is not configured, and the DCI 2 may be received based on a second CORESET in which CORESETPoolindex is configured to 1. For example, the DCI (e.g., DCI 1, DCI 2) and/or data (e.g., data 1, data 2) may include control information/data related to the operations described in the above-described method (e.g., embodiment 1, embodiment 1-1, embodiment 2, or a combination of one or more of detailed examples thereof).

As mentioned above, the above-described network-side/UE signaling and embodiment (e.g., embodiment 1, embodiment 1-1, embodiment 2, or a combination of one or more of the detailed embodiments thereof) may be implemented by the apparatus to be described with reference to FIG. 11. For example, the network side (e.g., TRP 1/TRP 2) may correspond to the first device 100, and the UE may correspond to the second device 200, and vice versa may be considered in some cases.

Figure 11:
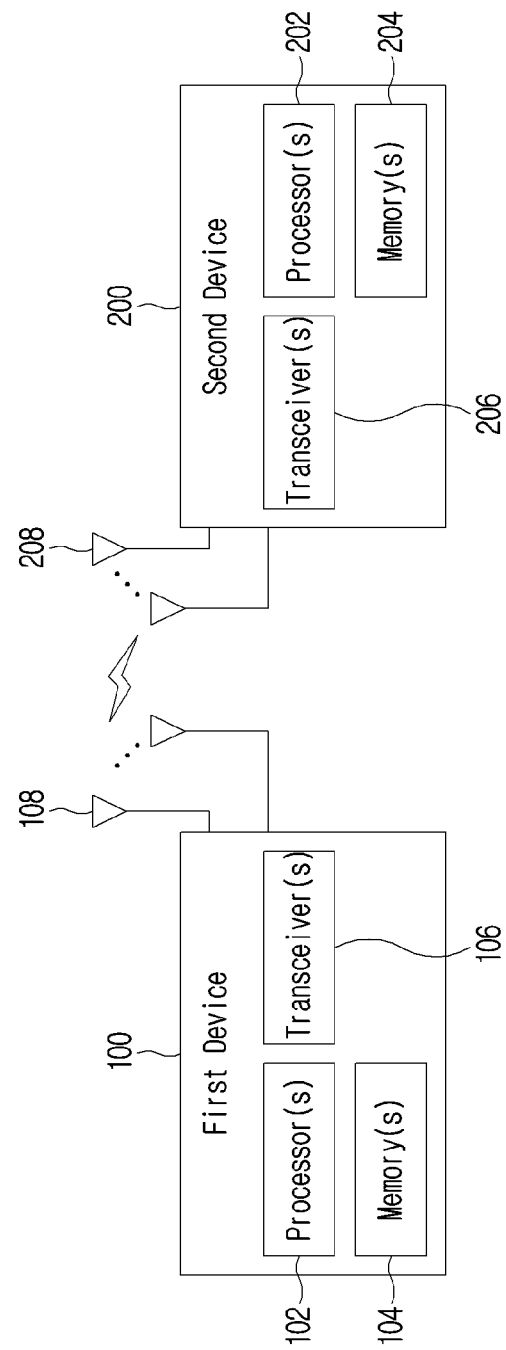
FIG. 11 illustrates a block diagram of a wireless communication system according to an embodiment of the present disclosure.

For example, the network-side/UE signaling and operation described above (e.g., embodiment 1, embodiment 1-1, embodiment 2, or a combination of one or more of detailed embodiments thereof) may be processed by one or more processors (e.g., 102, 202) of FIG. 11, and the above-described network-side/UE signaling and operations (e.g., embodiment 1, embodiment 1-1, embodiment 2, or a combination of one or more of detailed embodiments thereof) may be stored in a memory (e.g., one or more memories of FIG. 11 (e.g., 104, 204)) in the form of instructions/programs (e.g., instruction, executable code) for driving at least one processor (e.g., 102 and 202) of FIG. 11.

General Device to Which the Present Disclosure May be Applied

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a user equipment (UE) in a wireless communication system, the method comprising:
   receiving, from a base station, a radio resource control (RRC) signaling related to a beam failure recovery (BFR) procedure for each of a plurality of serving cells configured with two beam failure detection (BFD)-reference signal (RS) sets;
   based on a beam failure being detected for at least one of the two BFD-RS sets configured for at least one serving cell among the plurality of serving cells, triggering the BFR procedure for the at least one of the two BFD-RS sets based on the RRC signaling; and
   transmitting, to the base station, an enhanced BFR media access control (MAC)-control element (CE),
   wherein the enhanced BFR MAC CE includes i) at least one first field corresponding to each of the at least one serving cell indicating whether the beam failure is detected for a single BFD-RS set among the two BFD-RS sets or all of the two BFD-RS sets, ii) a second field indicating an identity (ID) of at least one BFD-RS set among the two BFD-RS sets, iii) a third field indicating whether the beam failure is detected for at least one of two BFD-RS sets configured for a special cell (SpCell) among the plurality of serving cells, and iv) at least one fourth field corresponding to at least one secondary cell (SCell) among the plurality of serving cells, and
   wherein each of the at least one fourth field indicates whether the beam failure is detected for each of the at least one SCell.

2. The method of claim 1, wherein:
   the enhanced BFR MAC CE includes a fifth field indicating whether a sixth field related to an index of a candidate beam RS is present in the enhanced BFR MAC CE.

3. The method of claim 2, wherein:
   the candidate beam RS includes an RS having a quality value greater than or equal to a predefined value among at least one candidate beam list.

4. The method of claim 1, wherein:
   each of the two BFD-RS sets includes at least one BFD-RS associated with at least one transmission configuration indicator (TCI) state configured for each of two control resource sets (CORESETs).

5. The method of claim 1, wherein:
   the RRC signaling includes information related to a beam failure recovery timer and information related to a candidate beam RS list.

6. A user equipment (UE) configured to operate in a wireless communication system, the UE comprising:
   at least one transceiver for transmitting and receiving wireless signals; and
   at least one processor for controlling the at least one transceiver,
   wherein the at least one processor is configured to:
   receive, from a base station through the at least one transceiver, a radio resource control (RRC) signaling related to a beam failure recovery (BFR) procedure for each of a plurality of serving cells configured with two beam failure detection (BFD)-reference signal(RS) sets;
   based on a beam failure being detected for at least one of the two BFD-RS sets configured for at least one serving cell among the plurality of serving cells, trigger the BFR procedure for the at least one of the two BFD-RS sets based on the RRC signaling; and transmit, to the base station through the at least one transceiver, an enhanced BFR media access control (MAC)-control element (CE), wherein the enhanced BFR MAC CE includes i) at least one first field corresponding to each of the at least one serving cell indicating whether the beam failure is detected for a single BFD-RS set among the two BFD-RS sets or all of the two BFD-RS sets, ii) a second field indicating an identity (ID) of at least one BFD-RS set among the two BFD-RS sets, iii) a third field indicating whether the beam failure is detected for at least one of two BFD-RS sets configured for a special cell (SpCell) among the plurality of serving cells, and iv) at least one fourth field corresponding to at least one secondary cell (SCell) among the plurality of serving cells, and wherein each of the at least one fourth field indicates whether the beam failure is detected for each of the at least one SCell.

7. The UE of claim 6, wherein:

the enhanced BFR MAC CE includes a fifth field indicating whether a sixth field related to an index of a candidate beam RS is present in the enhanced BFR MAC CE.

8. The UE of claim 7, wherein:

the candidate beam RS includes an RS having a quality value greater than or equal to a predefined value among at least one candidate beam list.

9. The UE of claim 6, wherein:

each of the two BFD-RS sets includes at least one BFD-RS associated with at least one transmission configuration indicator (TCI) state configured for each of two control resource sets (CORESETs).

10. The UE of claim 6, wherein:

the RRC signaling includes information related to a beam failure recovery timer and information related to a candidate beam RS list.

\* \* \* \* \*